US008068248B2

(12) United States Patent
Kida

(10) Patent No.: US 8,068,248 B2
(45) Date of Patent: Nov. 29, 2011

(54) INFORMATION NOTIFICATION DEVICE ON IMAGE FORMING APPARATUS IN A SLEEPING MODE

(75) Inventor: Yasuhiko Kida, Osaka (JP)

(73) Assignee: Kyocera Mita Corporation (JP)

( * ) Notice: Subject to any disclaimer, the term of this patent is extended or adjusted under 35 U.S.C. 154(b) by 1074 days.

(21) Appl. No.: 11/768,019

(22) Filed: Jun. 25, 2007

(65) Prior Publication Data

US 2008/0013122 A1 Jan. 17, 2008

(30) Foreign Application Priority Data

Jul. 12, 2006 (JP) ................................ 2006-191235

(51) Int. Cl.
*G06F 3/12* (2006.01)

(52) U.S. Cl. ..................................... 358/1.15; 358/1.13

(58) Field of Classification Search ................. 358/1.13, 358/1.15; 399/70, 75; 713/300–340
See application file for complete search history.

(56) References Cited

U.S. PATENT DOCUMENTS 6,807,907 B2 * 10/2004 Yamada ........................ 101/484
2004/0146313 A1 * 7/2004 Uchizono et al. ............... 399/75

FOREIGN PATENT DOCUMENTS

JP 09-214659 A * 8/1997
JP 2004-130526 A * 4/2004
JP 2005-88499 A * 4/2005
JP 2005-119203 5/2005

* cited by examiner

*Primary Examiner* — Benny Tieu
*Assistant Examiner* — Qian Yang
(74) *Attorney, Agent, or Firm* — Ostrolenk Faber LLP

(57) ABSTRACT

An information notification device 1 includes a memory unit 3, a request reception unit 42, and a communication unit 2. The memory unit 3 stores first equipment information indicating the internal state of a printer engine 113. When the image forming apparatus 101 is in sleep mode, the request reception unit 42 receives requests for second equipment information indicating the current state of the image forming apparatus 101. When the second equipment information is low rate of change with time first attribute information, the communication unit 2 transmits the first equipment information to the requesting source. When the second equipment information is second attribute information, whose rate of change with time is higher than first attribute information, the power supply 114 supplies power to the engine 113, the communication unit 2 obtains the second equipment information from the engine 113 and transmits it to the requesting source.

6 Claims, 8 Drawing Sheets

INFORMATION NOTIFICATION DEVICE ON IMAGE FORMING APPARATUS IN A SLEEPING MODE

CROSS-REFERENCE TO RELATED APPLICATIONS

This application claims priority to Japanese Patent Application No. 2006-191235 filed on Jul. 12, 2006. The entire disclosure of Japanese Patent Application No. 2006-191235 is hereby incorporated herein by reference.

BACKGROUND OF THE INVENTION

1. Field of the Invention

The present invention generally relates to an information notification device. More specifically, the present invention relates to an information notification device for an image forming apparatus having a printer engine capable of forming images on a recording medium, and an electrical power supply unit capable of supplying electrical power to the printer engine.

2. Background Information

In recent years, image forming apparatuses provided with what is known as a sleep mode can be frequently seen. Sleep mode is a mode in which electrical power is provided to only the minimum necessary units of the units in the apparatus, in order to reduce electrical power consumption.

Furthermore, this type of image forming apparatus sometimes includes an information notification device that notifies the user of equipment information indicating the current internal state of the image forming apparatus, such as the number of sheets of paper, the amount of toner remaining, and so on. For example, if the image forming apparatus is capable of being connected to and communicating with an external apparatus such as a PC or the like, a user can obtain the desired equipment information regarding the image forming apparatus by using an external apparatus to request the current equipment information from the image forming apparatus.

An apparatus of this type is known in which when an equipment information request is received during sleep mode, electrical power is provided to the necessary units so that the equipment information regarding the current state within the apparatus can be obtained as shown in Japanese Patent Application Laid-open No. 2004-130526. Also, an apparatus of this type is known in which equipment information is stored in a storage unit just before the image forming apparatus is turned off, and when the image forming apparatus receives an equipment information request in sleep mode, the equipment information in the storage unit is transmitted to the source of the request as shown in Japanese Patent Application Laid-open No. H9-214659.

A technology related to this is an image forming apparatus in which when several instructions to execute image forming processes are received in sleep mode, these processes are carried out together at a specific time as shown in Japanese Patent Application Laid-open No. 2005-88499.

In the apparatus of Japanese Patent Application Laid-open No. 2004-130526, every time a request for equipment information is received, it is necessary to supply electrical power to the printer engine that forms images on sheets, to start up the printer engine, and to obtain the current equipment information from the printer engine. However, starting up the printer engine generates noise, and electrical power is consumed.

Also, in the apparatus of Japanese Patent Application Laid-open No. H9-214659, the equipment information output to the source of the request is not necessarily the most recent information. In other words, the information is not necessarily the equipment information at the time that the request was received. Therefore, there is a possibility that equipment information is output to the source of the request that is very different from the current state of the image forming apparatus.

In view of the above, it will be apparent to those skilled in the art from this disclosure that there exists a need for an improved image notification device. This invention addresses this need in the art as well as other needs, which will become apparent to those skilled in the art from this disclosure.

SUMMARY OF THE INVENTION

In view of the aforementioned problems, it is therefore an object of the present invention to provide an image forming apparatus capable of providing highly accurate equipment information regarding the current state of the image forming apparatus to the source of a request, when a request for equipment information is received during sleep mode, while minimizing the electrical power consumption of the image forming apparatus.

According to a first aspect of the present invention an information notification device of an image forming apparatus having a printer engine capable of forming images on a recording medium and a power supply unit capable of supplying electrical power to the printer engine, has a memory unit, a request reception unit, and a notification unit. The memory unit records first equipment information that indicates the internal state of the printer engine. The request reception unit receives requests from outside for second equipment information that indicates the current state of the printer engine, while the power supply unit is not supplying electrical power to the printer engine. The notification unit transmits the first equipment information stored in the memory unit when second equipment information that is the subject of a request received by the request reception unit is low rate of change first attribute information. Also, when the second equipment information that is the subject of the request is second attribute information, whose rate of change with time is higher than that of first attribute information, the power supply unit supplies electrical power to the printer engine, and the notification unit obtains the second equipment information from the printer engine, which is supplied with electrical power by the power supply unit, and transmits the second equipment information.

Equipment information may include the quantity of toner, the number of sheets remaining, and so on. If the requested second equipment information is high rate of change with time second attribute information, electrical power is supplied to the printer engine, and the information notification device obtains the second equipment information, which indicates the current state, from the printer engine, and transmits the second equipment information. Therefore it is possible to supply more accurate equipment information to the source of the request. Also, if the requested second equipment information is low rate of change with time first attribute information, the information notification device obtains the first equipment information from the memory unit, without supplying electrical power to the printer engine, and transmits the first equipment information. Therefore it is possible to minimize the power consumption of the image forming apparatus.

In this way, the information notification device can select whether to give priority to accuracy of information or whether to give priority to minimization of electrical power consumption of the image forming apparatus, depending on the extent to which the requested equipment information varies with time, and provide the equipment information regarding the image forming apparatus to the source of the request.

An information notification device according to a second aspect of the present invention is the information notification device according to the first aspect, further including an update unit. The update unit updates the first equipment information stored in the memory unit with the second equipment information, when the second equipment information that is the subject of the request is second attribute information.

In this way, when the information notification device receives the next request for second equipment information from outside, even if the request based on the requirements of the user is for first equipment information that is obtained from the memory unit and transmitted to the source of the request, the difference between the transmitted first equipment information and the current state of the printer engine can be kept to a minimum.

An information notification device according to a third aspect of the present invention is the information notification device according to the first aspect, wherein the notification unit is a communication unit capable of transmitting the first or second equipment information to an external device via a network.

The image forming apparatus can be, for example, a printer or multi-function printer connected to a network. In this way, the information notification device can be applied to image forming apparatuses capable of being connected to external devices.

An information notification device according to a fourth aspect of the present invention is the information notification device according to the first aspect, wherein the notification unit is a display unit capable of displaying the first or second equipment information.

In this way, a user can directly obtain the current equipment information from the screen of the operation panel in the information notification device.

An information notification device according to a fifth aspect of the present invention is the information notification device according to the second aspect, further including a measurement unit. The measurement unit measures the standby time from when the update unit updates the first equipment information until the request reception unit receives a request for the second equipment information from outside. When the second equipment information that is the subject of a request is third attribute information having a rate of change with time higher than the first attribute information and lower than the second attribute information, and when the standby time is equal to or greater than a predetermined time, the power supply unit supplies electrical power to the printer engine. Then, when the second equipment information that is the subject of a request is the third attribute information, and when the standby time is equal to or greater than the predetermined time, the notification unit obtains the second equipment information from the printer engine to which electrical power has been supplied, and transmits the second equipment information. Also, when the second equipment information that is the subject of a request is the third attribute information, and when the standby time is less than the predetermined time, the notification unit transmits the first equipment information recorded in the memory unit.

In this way, there is more detailed adjustment regarding whether to give priority to accuracy of information, or to give priority to minimization of the power consumption of the image forming apparatus.

EFFECT OF THE INVENTION

The information notification device according to the present invention selects whether to give priority to accuracy of information or to give priority to minimization of electrical power consumption of the image forming apparatus, depending on the rate of change with time of the requested equipment information, when a request for equipment information is received during sleep mode. Therefore, the information notification device can minimize electrical power consumption of an image forming apparatus, and provide equipment information regarding the current state of the image forming apparatus to the source of a request, without loss of accuracy of the equipment information.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
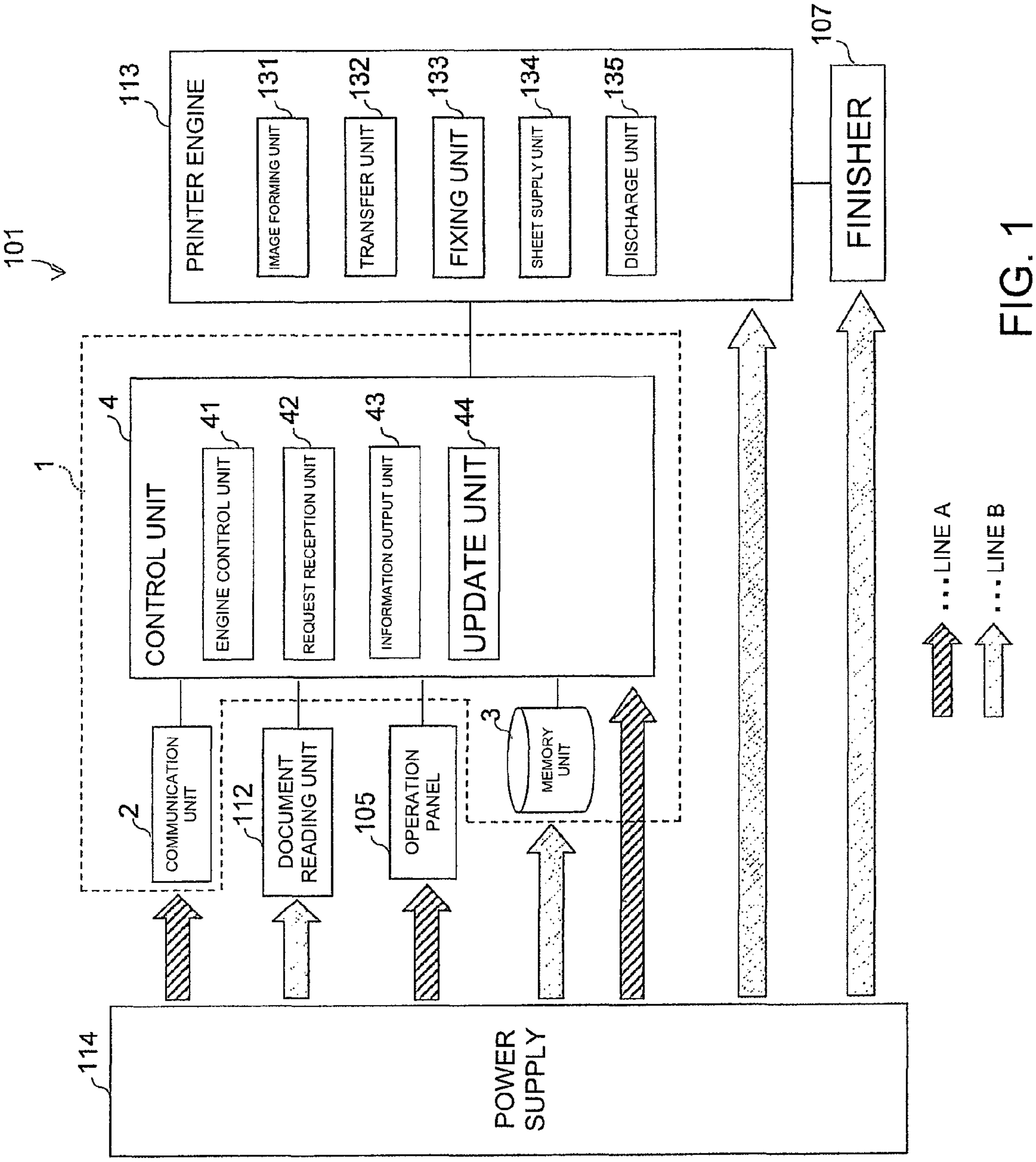
FIG. 1 is a view of a block diagram showing a schematic configuration of an image forming apparatus that includes an information notification device according to a first preferred embodiment of the present invention.
Figure 2:
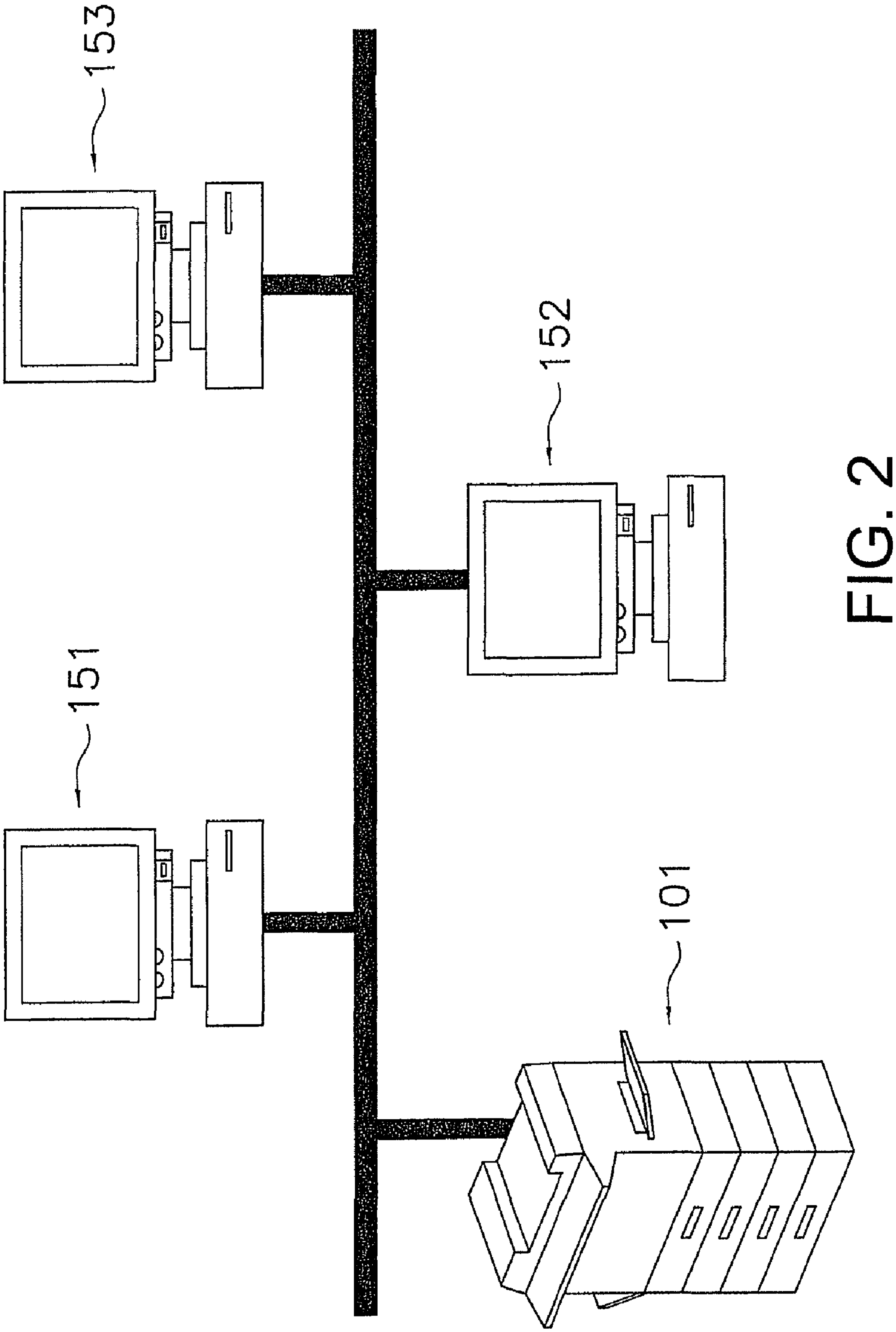
FIG. 2 is a view of a diagram of the configuration of a system that uses the image forming apparatus.

FIG. 1 is a view of a block diagram showing the schematic configuration of an image forming apparatus 101 that includes an information notification device 1 according to the present embodiment. As shown in FIG. 2, the image forming apparatus 101 in the present embodiment is capable of communicating with PCs or other terminals 151, 152, and 153 via a network.

(1) Configuration of the Image Forming Apparatus

Figure 3:
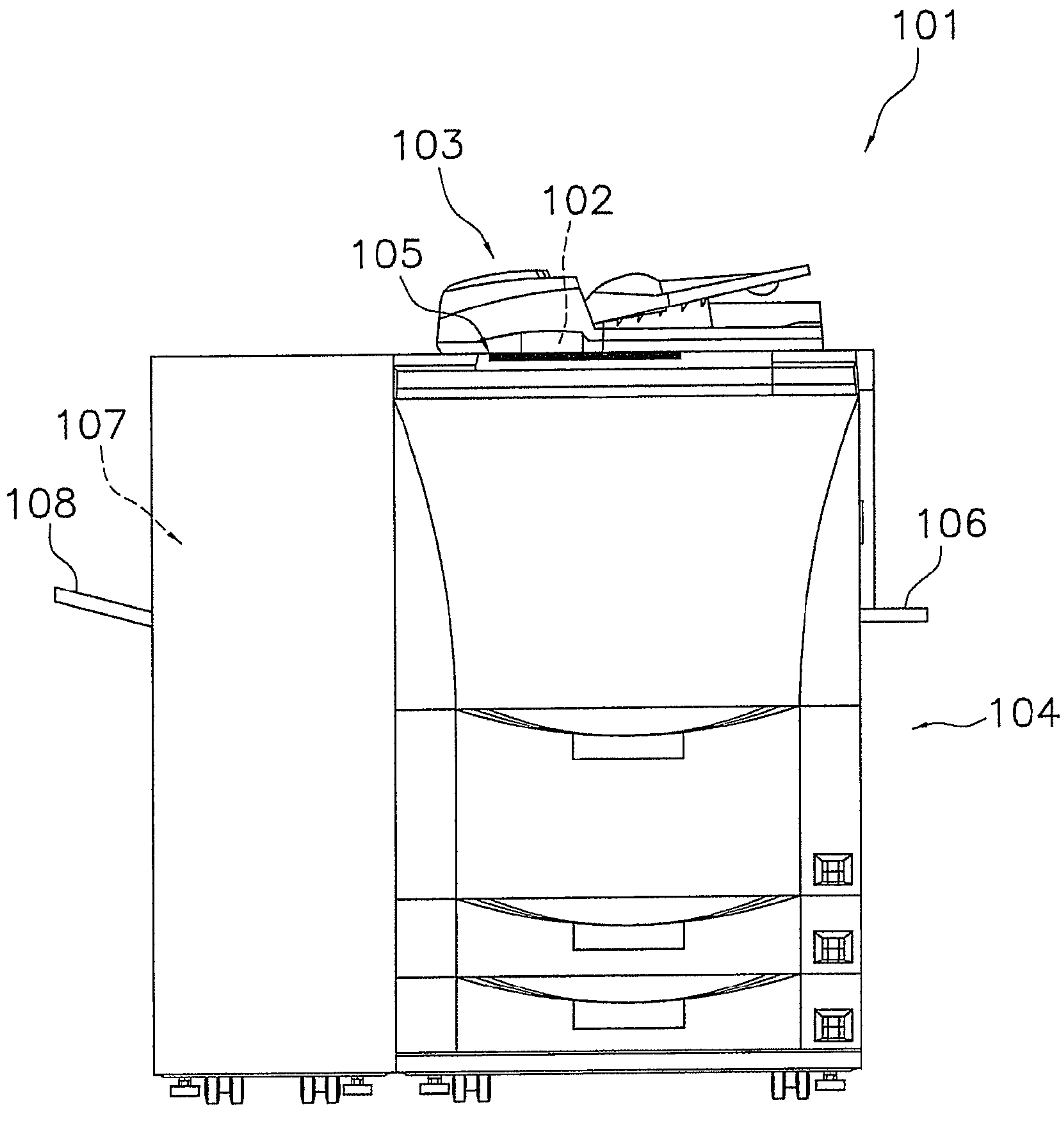
FIG. 3 is an external view of the image forming apparatus.

FIG. 3 is an external view of the image forming apparatus 101. The image forming apparatus 101 is a multi-function printer that preferably combines the functions of a photocopier, printer, facsimile, and scanner, and includes a sleep mode. The image forming apparatus 101 includes a document cover 103, a main body 104, an operation panel 105, a manual feed tray 106, a finisher 107, and a sheet discharge tray 108.

A document loading platform 102 is provided on the part of the main body 104 in opposition to the document cover 103. The document cover 103 presses down on documents loaded in the document loading platform 102. The document cover 103 is fitted to the main body 104 so that the document cover 103 can be freely opened and closed with respect to the document loading platform 102.

As shown in FIG. 1, the main body 104 includes a communication unit 2, a document reading unit 112, a printer engine 113, a power supply 114, and a control unit 4.

The communication unit 2 communicates with the other terminals 151 through 153, and acts as the notification unit in this embodiment. The document reading unit 112 reads image information recorded on documents to obtain image data, and includes an optical system that is not shown on the drawings. The printer engine 113 forms and outputs images on recording sheets. The printer engine 113 includes an image forming unit 131, a transfer unit 132, a fixing unit 133, a sheet supply unit 134 that includes a sheet supply cassette, and a discharge unit 135.

The power supply 114 supplies electrical power and stops the supply of electrical power to each unit of the image forming apparatus 101, such as the printer engine 113, the communication unit 2, and so on. For example, when the length of time during which the image forming apparatus 101 has not received an instruction to start image forming from outside exceeds a predetermined time, the power supply 114 supplies power only to the minimum number of units necessary to receive instructions to start image forming or the like, such as the communication unit 2, the operation panel 105, and the control unit 4 (line A in FIG. 1), and puts the image forming apparatus 101 into sleep mode. Also, when the image forming apparatus 101 receives an instruction to start image forming, the power supply 114 supplies electrical power to all the other units (line B in FIG. 1).

The control unit 4 is constituted by a computer that includes a CPU, and controls each unit that is connected to the control unit 4. For example, the control unit 4 functions as an engine control unit 41 that controls the printer engine 113, and carries out control as the information notification device 1 (described later).

Figure 4:
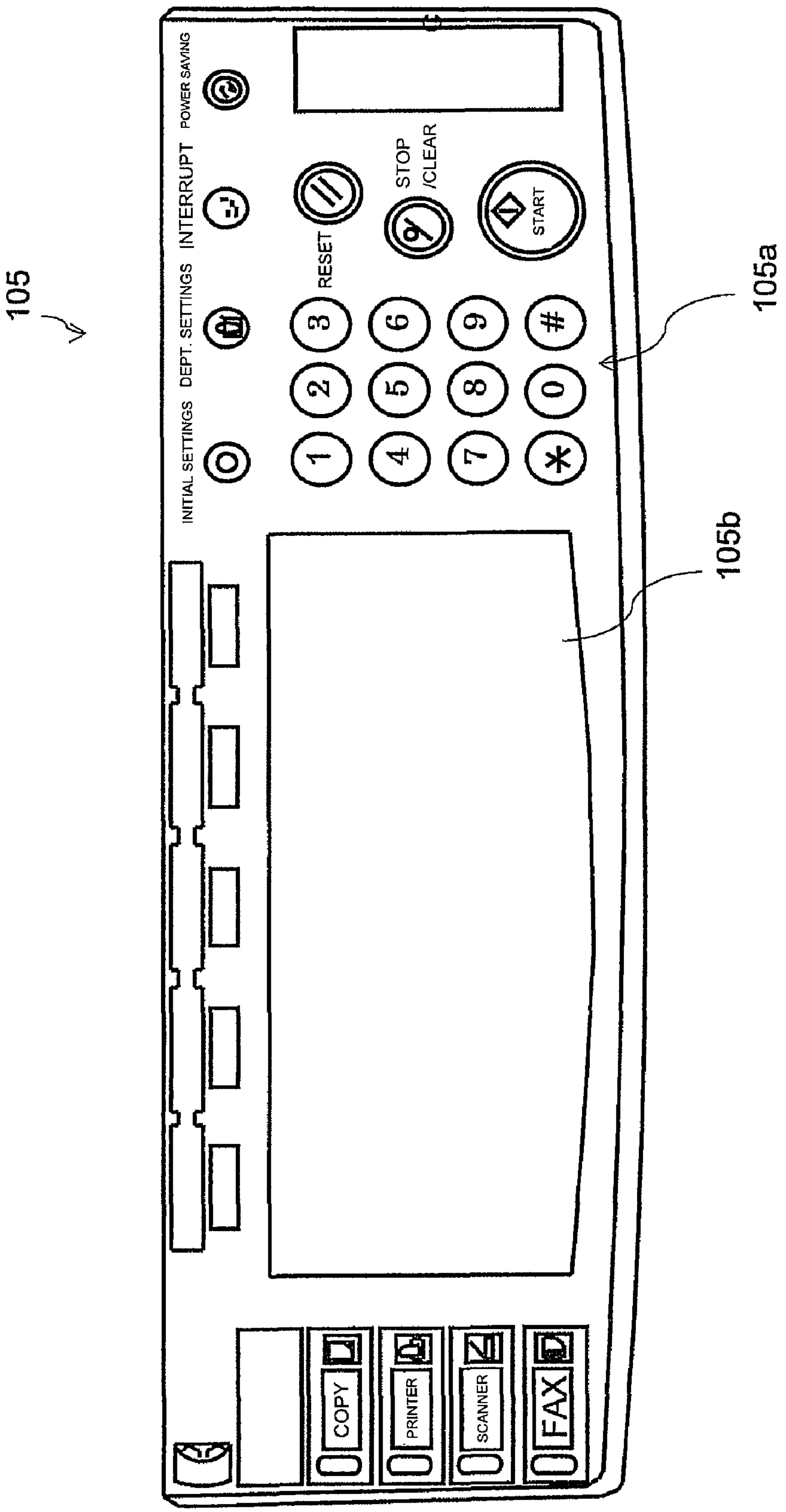
FIG. 4 is a view of an example of an operation panel of the image forming apparatus.

The operation panel 105 is provided on the near side of the document loading platform 102 on the main body 104, as shown in FIG. 3. As shown in FIG. 4, the operation panel 105 includes operation keys 105*a* and a touch panel 105*b*. The operation keys 105*a* include a start key to instruct the start of printing or other image forming processes, setting keys for various types of settings, a numerical keypad, and so on. The touch panel 105*b* is constituted by a liquid crystal display, and displays setting screens and so on.

The manual feed tray 106 is a plate shaped member provided on the side of the main body 104 that projects to the side and can be freely opened and closed. Recording sheets or documents can be loaded in the manual feed tray 106.

The finisher 107 is provided on the side surface of the image forming apparatus 101 on the opposite side of the manual feed tray 106, and carries out sorting, stapling, and other processes using recording sheets discharged from the discharge unit 135.

The sheet discharge tray 108 is provided on a side surface of the finisher 107 and projects to a side, preferably in a direction opposite the direction the manual feed tray 106 projects. Recording sheets processed by the finisher 107 are loaded into the sheet discharge tray 108.

(2) Configuration of the Information Notification Device

Next, the configuration of the information notification device 1 is explained. As shown in FIG. 1, the information notification device 1 includes the communication unit 2 which has already been explained, a memory unit 3, and the control unit 4.

The memory unit 3 is an auxiliary memory device, such as a HDD or the like, and stores first equipment information, including the internal status of the printer engine 113. The first equipment information includes remaining quantities of toner and sheets, replenishment information for toner and sheets, internal temperature and humidity of the printer engine 113, and so on. The first equipment information is periodically updated by an update unit 44 (described later) of the control unit 4.

When the image forming apparatus 101 is in sleep mode, and when a request for second equipment information that indicates the current status of the printer engine 113 is received from outside, the control unit 4 obtains the first equipment information from the memory unit 3 or current equipment information (that is, second equipment information) from the printer engine 113, based on the rate of change with time of the second equipment information that is the subject of the request, and provides the information to the outside. To carry out this operation, the control unit 4 functions as, apart from the engine control unit 41, a request reception unit 42, an information output unit 43, and the update unit 44.

Here, the rate of change with time of the second equipment information is simply explained. Second equipment information that does not change much with time is referred to as low rate of change with time first attribute information. First attribute information includes, for example, the remaining quantity of toner, and so on. Also, second equipment information that changes frequently with time is referred to as high rate of change with time second attribute information, rather than first attribute information. Second attribute information includes, for example, the temperature and humidity of the printer engine 113, and so on. In the present embodiment, the control unit 4 stores in a memory that is not shown in the drawings information (hereafter referred to as attribute information of the second equipment information) that indicates whether each second equipment information is first attribute information or second attribute information.

When the image forming apparatus 101 is in sleep mode, the request reception unit 42 receives requests for second equipment information that indicates the current status of the printer engine 113 from other terminals 151 through 153 via the communication unit 2.

When the request reception unit 42 receives a request for second equipment information from outside, the information output unit 43 first determines whether the second equipment information in the request is first attribute information or second attribute information, from the attribute information of second equipment information in the memory of the control unit 4. Next, the information output unit 43 outputs the first equipment information within the memory unit 3 to the communication unit 2, or starts up the printer engine 113, obtains new second equipment information from the printer engine 113, and outputs the new second equipment information to the communication unit 2. Specifically, when the second equipment information that is the subject of the request is first attribute information, first equipment information within the memory unit 3 is output to the communication unit 2. When the second equipment information that is the subject of the request is second attribute information, the information output unit 43 instructs the power supply 114 to supply electricity to the printer engine 113. Then second equipment information that indicates the current status is obtained from the printer engine 113 to which electrical power is supplied, and output to the communication unit 2.

When the second equipment information that is the subject of the request is second attribute information, the update unit 44 overwrites the first equipment information in the memory unit 3 with the second equipment information that the information output unit 43 obtained from the printer engine 113. In other words, the update unit 44 updates the equipment information in the memory unit 3 in a timely manner.

(3) Operation

Figure 5:
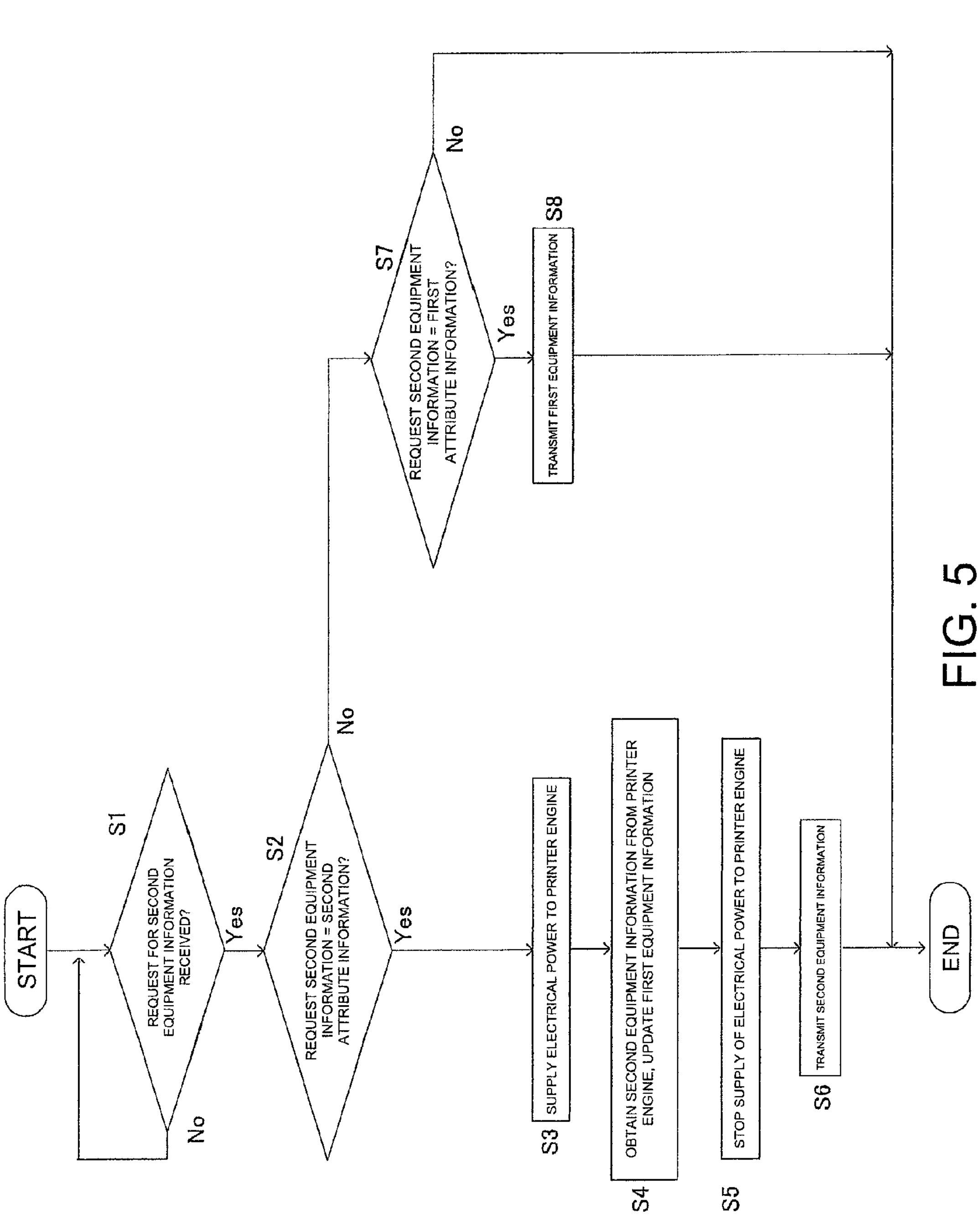
FIG. 5 is a view of a flowchart of the operation of the information notification device.

Next, the operation of the information notification device 1 is explained with reference to FIGS. 1, 2, and 5. It is assumed that when the image forming apparatus 101 is in sleep mode, electrical power is not supplied to the printer engine 113.

Steps S1 through S3: When a request for current second equipment information is obtained by the request reception unit 42 of the control unit 4 from other terminals 151 through 153 via the communication unit 2 (S1), the information output unit 43 determines whether the second equipment information that is the subject of the received request is first attribute information or second attribute information. When the second equipment information that is the subject of the request is second attribute information (S2), the information output unit 43 instructs the power supply 114 to supply electricity to the printer engine 113. In this way, electrical power is supplied to the printer engine 113 (S3).

Step S4: The information output unit 43 obtains the second equipment information that indicates the current status from the printer engine 113 to which electrical power is supplied, and outputs the second equipment information to the communication unit 2. The update unit 44 updates the first equipment information in the memory unit 3 with the second equipment information.

Steps S5 and S6: The power supply 114 stops the supply of electrical power to the printer engine 113 (S5), and the communication unit 2 transmits the second equipment information to the source of the request, which is the other terminals 151 through 153 (S6).

Steps S7 and S8: In step S2, when the second equipment information that is the subject of the request is first attribute information (S7), the information output unit 43 outputs the first equipment information within the memory unit 3 to the communication unit 2. The communication unit 2 transmits the first equipment information to the source of the request, which is the other terminals 151 through 153 (S8).

(4) Effect

When the requested second equipment information is high rate of change with time second attribute information, the information notification device 1 can provide more accurate equipment information to the source of the request, by supplying electrical power to the printer engine 113, obtaining second equipment information that indicates the current state, and transmitting the second equipment information to the source of the request. Also, when the requested second equipment information is low rate of change with time first attribute information, the information notification device 1 obtains the first equipment information within the memory unit 3 without supplying electrical power to the printer engine 113, and transmits the first equipment information to the source of the request. Therefore the image forming apparatus 101 can minimize the consumption of electrical power. In this way, the information notification device 1 can select whether to give priority to accuracy of information or whether to give priority to minimization of electrical power consumption of the image forming apparatus 101, depending on the extent to which the requested second equipment information varies with time, and provide the equipment information regarding the image forming apparatus 101 to the source of the request.

Also, when the information output unit 43 obtains second equipment information from the printer engine 113, the update unit 44 updates the first equipment information in the memory unit 3 with the second equipment information. In this way, when the information notification device 1 receives the next request for current equipment information, even if the request based on the requirements of the user is for first equipment information that is obtained from the memory unit 3 and transmitted to the source of the request, the difference between the transmitted first equipment information and the current state of the printer engine 113 can be kept to a minimum.

Second Embodiment

Alternate embodiments will now be explained. In view of the similarity between the first and alternate embodiments, the parts of the alternate embodiments that are identical to the parts of the first embodiment may be given the same reference numerals as the parts of the first embodiment. Moreover, the descriptions of the parts of the alternate embodiments that are identical to the parts of the first embodiment may be omitted for the sake of brevity.

Figure 6:
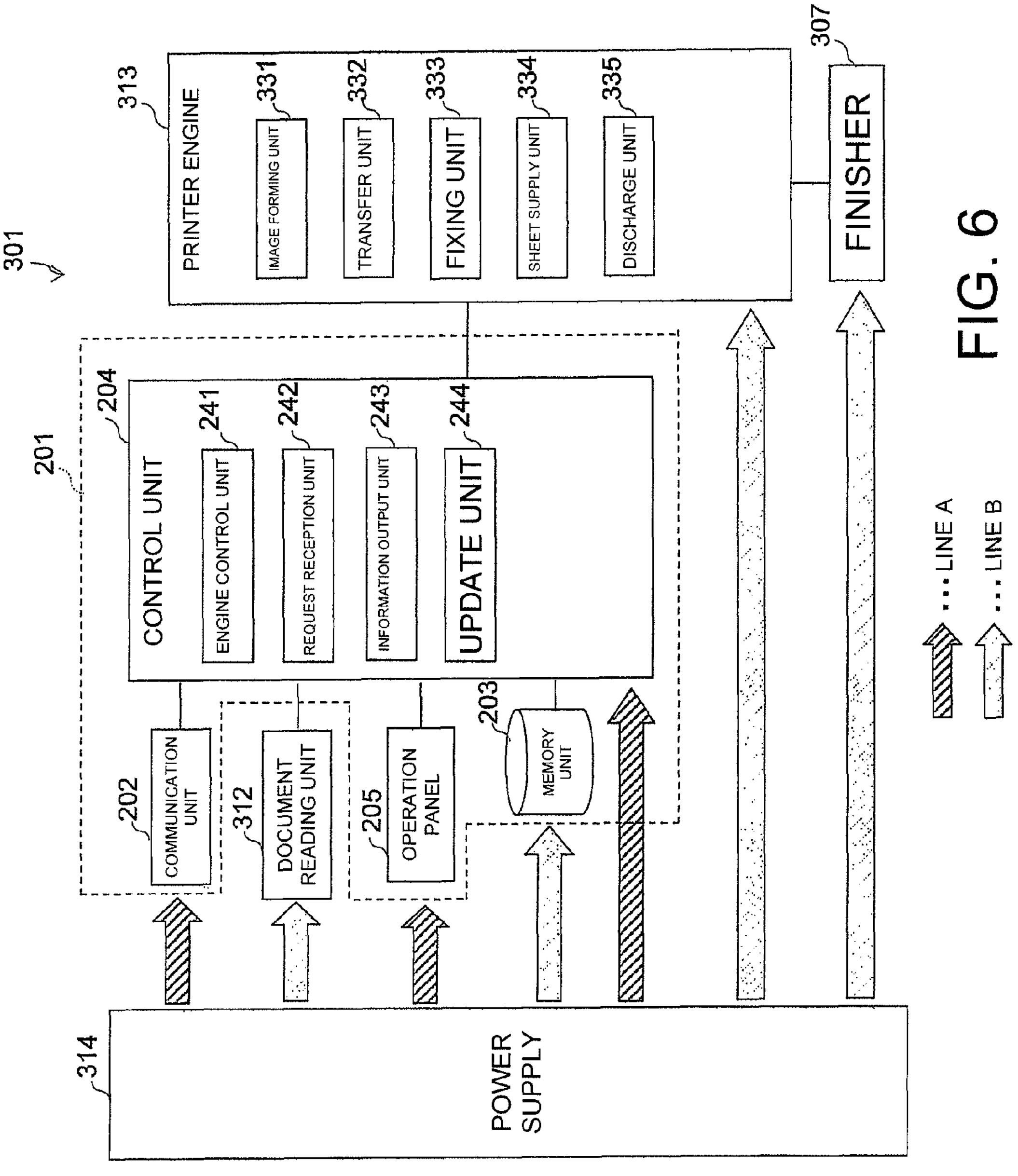
FIG. 6 is a view of a block diagram showing a schematic configuration of an image forming apparatus that includes an information notification device according to a second preferred embodiment of the present invention.

(a) In the above embodiment, when the information notification device receives a request for current equipment information (that is, second equipment information) from other devices on the network, the first equipment information or second equipment information is transmitted to the device that is the source of the request via the communication unit. However, the present invention is not limited to this. As shown in FIG. 6, it is possible for an information notification device 201 to include an operation panel 205, and receive the request for current equipment information from the screen of the operation panel 205. In this case, the information notification device 201 may display the current equipment information on the screen of the operation panel 205. As a result a user can directly obtain the current equipment information from the screen of the operation panel 205 in the information notification device 201, and thus, the operation panel acts as the notification unit. Except for the aforementioned arrangement, the image forming apparatus 301 of this embodiment has a power supply 314, the information notification device 201, document reading unit 312, printer engine 313, and finisher 307 arranged substantially identical or identical to those of the first embodiment. The information notification device 201 has a communication unit 202, memory unit 203, and control unit 204 having an engine control unit 241, request reception unit 242, information output unit 243, and update unit 244 arranged substantially identical or identical to those of the first embodiment. Finally, the printer engine 313 has an image forming unit 331, a transfer unit 332, a fixing unit 333, a sheet supply unit 334 that includes a sheet supply cassette, and a discharge unit 335 arranged substantially identical or identical to those of the first embodiment.

(b) The above embodiment has been explained for the case that the second equipment information that is the subject of a request can be either first or second attribute information. However, the present invention is not limited to this. The attribute information of second equipment information may be provided in three steps, with the extent of variation with time of the second equipment information increasing in the order first attribute information, third attribute information, and second attribute information. For example, "low" rate of change with time first attribute information may be equipment information on faults of components or the like within the printer engine. "Medium" rate of change with time third attribute information may be equipment information on the remaining quantities of sheets or toner. Then "high" rate of change with time second attribute information may be equipment information on the temperature or humidity within the printer engine, replenishment information for sheets or toner, and so on.

Figure 7:
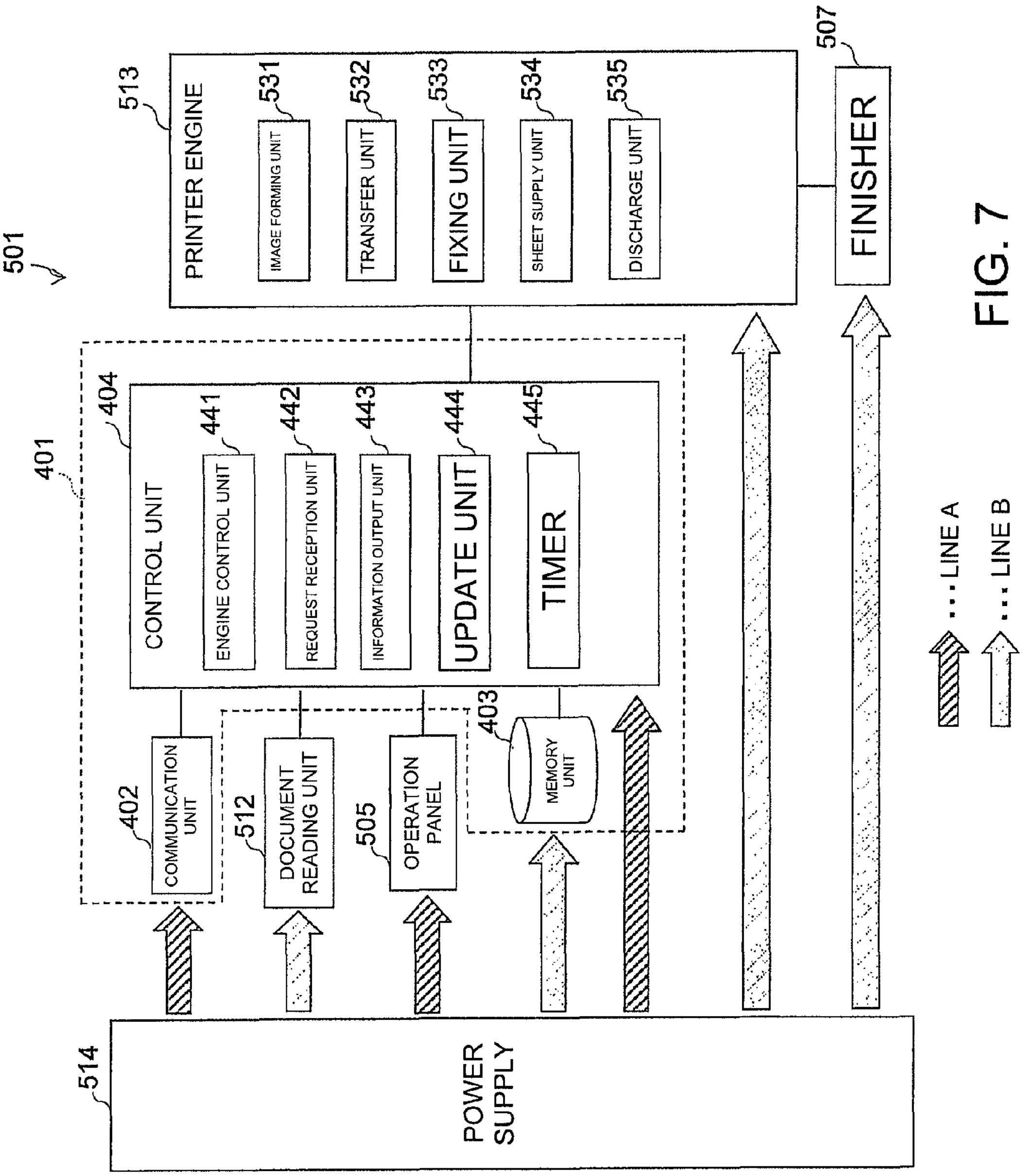
FIG. 7 is a view of a block diagram showing a schematic configuration of an image forming apparatus that includes an information notification device according to a third preferred embodiment of the present invention.

An image forming apparatus 501 that adopts an information notification device 401 of this type is shown in FIG. 7. The information notification device 401 further includes a timer 445 (corresponding to a measurement unit) in addition to the information notification device 1 according to the above embodiment. The timer 445 measures the standby time from update of the first equipment information in the memory unit 403 by the update unit 444, until receipt of a request from outside for second equipment information by the request reception unit 442. When the first equipment information in the memory unit 403 is updated by the update unit 444, the timer 445 resets the measured standby time, and re-starts the measurement (S105 in FIG. 8).

Figure 8:
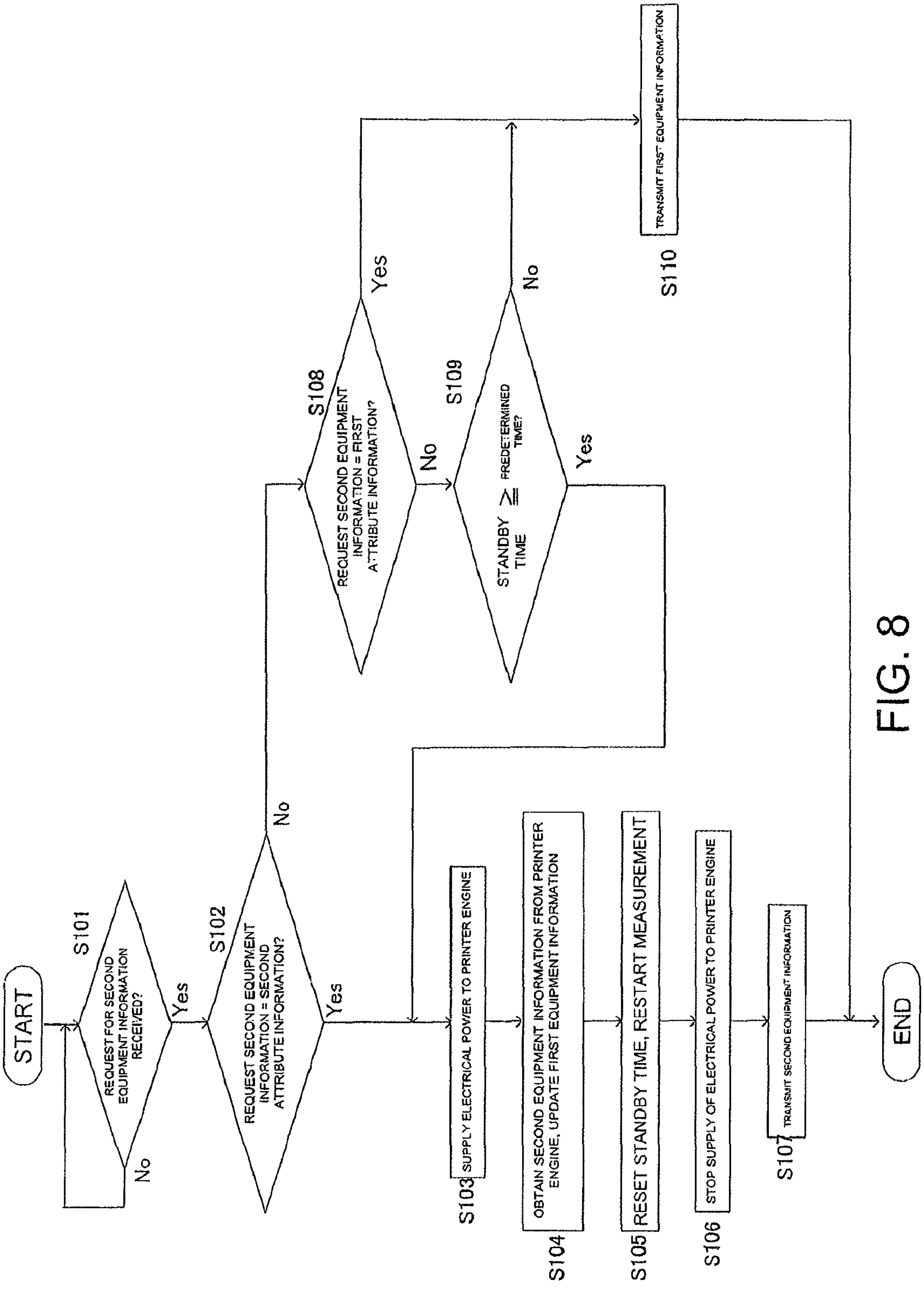
FIG. 8 is a view of a flowchart of the operation of the information notification device according to the third preferred embodiment.

Next, the operation of the information notification device 401 is simply explained using FIG. 8. If the second equipment information that is the subject of the request includes second attribute information (S102), the power supply 514 of the image forming apparatus 401 supplies electrical power to the printer engine 513, and the communication unit 402 obtains the second equipment information from the printer engine 513, and transmits it to the source of the request (S103 through S107). If the second equipment information is first attribute information, the communication unit 402 transmits the first equipment information in the memory 403 (S110). In particular, if the second equipment information that is the subject of the request includes third attribute information, depending on whether the standby time for the second equipment information is equal to or greater than a predetermined time (S109), the communication unit 402 obtains the second equipment information from the printer engine 513 or first equipment information from the memory unit 403, and transmits it to the source of the request (S107, S110). Specifically, if the standby time is equal to or greater than the predetermined time (S109: YES), the power supply 514 supplies electrical power to the printer engine 513, and the communication unit 402 obtains the current second equipment information from the printer engine 513, and transmits it to the source of the request (S103 through S107). Also, if the standby time is less than the predetermined time (S109: NO), the communication unit 402 transmits the first equipment information in the memory 402 (S110). In this way, there is more detailed adjustment regarding whether to give priority to accuracy of information, or to give priority to minimization of the power consumption of the image forming apparatus.

Except for the aforementioned arrangement, the image forming apparatus 501 of this embodiment has a power supply 514, the information notification device 401, document reading unit 512, operation panel 505, printer engine 513, and finisher 507 arranged substantially identical or identical to those of the first embodiment. The information notification device 401 has a communication unit 402, the memory unit 403, and control unit 404 having an engine control unit 441, request reception unit 442, information output unit 443, and update unit 444 arranged substantially identical or identical to those of the first embodiment. Finally, the printer engine 513 has an image forming unit 531, a transfer unit 532, a fixing unit 533, a sheet supply unit 534 that includes a sheet supply cassette, and a discharge unit 535 arranged substantially identical or identical to those of the first embodiment.

INDUSTRIAL APPLICABILITY

The information notification device according to the present invention may be used as a device within all kinds of photocopiers, printers, facsimiles, and multi-function printers that combine these functions with the function of a scanner, to provide equipment information indicating the current state within the apparatus.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of an image forming apparatus equipped with the present invention. Accordingly, these terms, as utilized to describe the present invention should be interpreted relative to an image forming apparatus equipped with the present invention as normally used. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An information notification device of an image forming apparatus having a printer engine being configured to form images on a recording medium and a power supply unit being configured to supply electrical power to the printer engine, the information notification device comprising:

a memory unit being configured to record first equipment information indicating an internal state of the printer engine;

a request reception unit being configured to receive requests from outside for second equipment information indicating a current state of the printer engine while electrical power is not supplied to the printer engine by the power supply unit;

a notification unit being configured to transmit the first or second equipment information, wherein when the second equipment information being a subject of a request received by the request reception unit is first attribute information indicating a low rate of change with time, the power supply unit does not supply electrical power to the printer engine and the notification unit transmits the first equipment information stored in the memory unit, and when the second equipment information being the subject of the request is second attribute information indicating a rate of change with time being higher than that of the first attribute information, the power supply unit supplies electrical power to the printer engine, and the notification unit obtains the second equipment information from the printer engine being supplied with electrical power by the power supply unit, and the notification unit transmits the second equipment information;

an update unit being configured to update the first equipment information stored in the memory unit with the second equipment information, when the second equipment information that is the subject of a request is second attribute information; and a measurement unit being configured to measure a standby time from when the update unit updates the first equipment information until the request reception unit receives a request for the second equipment information from outside, wherein when the second equipment information that is the subject of a request is third attribute information having a rate of change with time higher than the first attribute information and lower than the second attribute information and the standby time is equal to or greater than a predetermined time, the power supply unit supplies electrical power to the printer engine, when the second equipment information that is the subject of a request is the third attribute information and the standby time is equal to or greater than the predetermined time, the notification unit obtains the second equipment information from the printer engine to which electrical power has been supplied, and transmits the second equipment information, and when the second equipment information that is the subject of a request is the third attribute information and the standby time is less than the predetermined time, the notification unit transmits the first equipment information recorded in the memory unit.

2. The information notification device according to claim 1, wherein the notification unit is a communication unit configured to transmit the first or second equipment information to an external device via a network.

3. The information notification device according to claim 1, wherein the notification unit is a display unit configured to display the first or second equipment information.

4. An image forming apparatus, comprising:

a printer engine being configured to form images on a recording medium;

a power supply unit being configured to supply electrical power to the printer engine; and an information notification device including a memory unit being configured to record first equipment information indicating an internal state of the printer engine, a request reception unit being configured to receive requests from outside for second equipment information indicating a current state of the printer engine while electrical power is not supplied to the printer engine by the power supply unit, and a notification unit being configured to transmit the first or second equipment information, wherein when the second equipment information being a subject of a request received by the request reception unit is first attribute information indicating a low rate of change with time, the power supply unit does not supply electrical power to the printer engine and the notification unit transmits the first equipment information stored in the memory unit, and when the second equipment information being the subject of the request is second attribute information indicating a rate of change with time being higher than that of the first attribute information, the power supply unit supplies electrical power to the printer engine, and the notification unit obtains the second equipment information from the printer engine being supplied with electrical power by the power supply unit, and transmits the second equipment information, wherein the information notification device further includes an update unit to update the first equipment information stored in the memory unit with the second equipment information, when the second equipment information that is the subject of the request is second attribute information, wherein the information notification device further includes a measurement unit that measures a standby time from when the update unit updates the first equipment information until and the request reception unit receives a request for the second equipment information from outside, wherein when the second equipment information that is the subject of a request is third attribute information having a range of change with time higher than the first attribute information and lower than the second attribute information and the standby time is equal to or greater than a predetermined time, the power supply unit supplies electrical power to the printer engine, when the second equipment information that is the subject of a request is the third attribute information and the standby time is equal to or greater than the predetermined time, the notification unit obtains the second equipment information from the printer engine to which electrical power has been supplied, and transmits the second equipment information, when the second equipment information that is the subject of a request is the third attribute information and the standby time is less than the predetermined time, the notification unit transmits the first equipment information recorded in the memory unit, an update unit being configured to update the first equipment information stored in the memory unit with the second equipment information, when the second equipment information that is a subject of a request is second attribute information, and a measurement unit being configured to measure a standby time from when the update unit updates the first equipment information until the request reception unit receives a request for the second equipment information from outside.

5. The image forming apparatus according to claim 4, wherein the notification unit is a communication unit configured to transmit the first or second equipment information to an external device via a network.

6. The image forming apparatus according to claim 4, wherein the notification unit is a display unit configured to display the first or second equipment information.

* * * * *